United States Patent Office

3,632,561
Patented Jan. 4, 1972

3,632,561
MALEIC ANHYDRIDE ALKYL VINYL ETHER COPOLYMER
Alexander Ramsay Maund Gibb, Troon, and Brian Benjamin Darlow, Stevenston, Scotland, assignors to Imperial Chemical Industries Limited, London, England
No Drawing. Filed June 8, 1967, Ser. No. 644,487
Claims priority, application Great Britain, July 8, 1966, 30,819/66
Int. Cl. C08f *15/02*
U.S. Cl. 260—78.5 BB      14 Claims

ABSTRACT OF THE DISCLOSURE

Maleic anhydride/alkyl vinyl ether copolymers of high molecular weight are prepared by reacting the two components in the presence of a free-radical-generating agent.

---

This invention relates to a process for the preparation of a copolymer of maleic anhydride and alkyl vinyl ether and to the copolymer produced thereby.

Copolymers of maleic anhydride and alkyl vinyl ether as prepared by processes hitherto proposed have had rather low molecular weights which were undesirably low for certain applications. Attempts have been made to increase the molecular weight by cross-linking with compounds such as polyallyl ether, polyamino or polyhydroxy compounds, but the cross-linking was difficult to control and the products gave solutions with different viscosity characteristics from those of linear polymers.

It is an object of this invention to provide a process for the preparation of maleic anhydride/alkyl vinyl ether copolymer which is capable of giving higher molecular weight copolymer than the processes proposed hitherto.

In accordance with this invention a process for the preparation of maleic anhydride/alkyl vinyl ether copolymer comprises reacting maleic anhydride with alkyl vinyl ether in the presence of methylene chloride and a free-radical-generating agent, the molar proportion of alkyl vinyl ether being in excess of the molar proportion of maleic anhydride.

The preferred alkyl vinyl ethers for use in the process of the invention are the lower alkyl vinyl ethers including methyl, ethyl, n-propyl, isopropyl, n-butyl and isobutyl vinyl ethers.

Preferably the molar ratio of alkyl vinyl ether to maleic anhydride should be at least 1.5:1 but there is no further advantage in using a ratio of more than 12:1.

The maleic anhydride present should preferably constitute 1 to 20% by weight and more preferably 6 to 10% by weight of the reaction mixture, and it is also preferred that the weight of methylene chloride present should be at least twice the weight of the maleic anhydride. Especially valuable copolymers are obtained using reaction mixtures comprising 6 to 10% by weight of maleic anhydride, 16 to 70% by weight of alkyl vinyl ether and 24 to 74% of methylene chloride.

Suitable free-radical-generating agents include organic peroxides or hydroperoxides, per-esters or azo-compounds such as, for example, lauroyl peroxide, benzoyl peroxide and azobisisobutyronitrile. The rate of copolymerisation reaction depends on the rate of generation of free radicals and this in turn is dependent on the concentration of the free-radical-generating agent and the temperature of the reaction mixture. A convenient amount of free-radical-generating agent is 0.005 to 5% by weight of the maleic anhydride; preferably the amount is 0.01 to 1% by weight of the maleic anhydride. A convenient reaction temperature is one within the range 35 to 80° C.

The copolymerization may conveniently be carried out under reflux conditions at atmospheric pressure but it is generally preferable to carry it out in a closed vessel under superatmospheric pressure. The reaction mixture should preferably be efficiently stirred or agitated during the reaction.

The reaction proceeds smoothly with no large increase in pressure and may readily be arranged to go to completion in 3 to 8 hours. The copolymer is readily separated from the reaction mixture, and methylene chloride and excess alkyl vinyl ether may readily be recovered and, if desired, re-used in the reaction.

Using the process of the invention it is possible to prepare copolymers of maleic anhydride and alkyl vinyl ether which give solutions of greatly enhanced specific viscosity.

$$\left(\text{Specific viscosity} = \frac{\text{Viscosity of solution} - \text{Viscosity of solvent}}{\text{Viscosity of solvent}}\right)$$

For example, copolymers giving 1% solutions (by weight) in methyl ethyl ketone at 25° C. having specific viscosities of 21 may readily be prepared whereas using the processes proposed hitherto the corresponding solutions had specific viscosities of less than 8 and generally less than 4.

Copolymers prepared by the process of this invention are especially useful in the preparation of thickeners for aqueous dispersions, latices, emulsion paints and detergents, adhesives such as wallpaper adhesives, flocculants for water clarification, soil stabilisation agents, pharmaceutical and cosmetic preparations. The copolymers are advantageously used for paper adhesives in salt form and especially in the form of their amide ammonium salts, which may be readily prepared by treatment of the copolymer with ammonia either before or after separation of the copolymer from the reaction mixture.

The invention is further illustrated by the following examples in which all parts and percentages are by weight.

EXAMPLE 1

300 parts maleic anhydride, 936 parts methyl vinyl ether (being a molar ratio of 1 to 5.3), 4,000 parts methylene chloride and 1 part lauroyl peroxide were mixed in a stainless steel pressure vessel provided with a stirrer and a jacket suitable for heating or cooling. The mixture was stirred, heated to 60° C. and held at this temperature for 5.5 hours, by which time polymerisation was complete. Excess methyl vinyl ether was distilled from the reaction vessel and recovered in a trap cooled in an ice/salt bath. The polymer slurry was filtered and dried to give 458 parts (98% theoretical yield) of maleic anhydride/methyl vinyl ether copolymer as a fine white powder. Its specific viscosity measured as a 1% solution in methyl ethyl ketone at 25° C. was 13.4.

The copolymer was dissolved in aqueous sodium hydroxide to give a 1% solution of the sodium salt pH 7. Its viscosity values measured with a Brookfield LTV viscometer using different spindles and speeds were:

| Spindle | Speed | Viscosity (centipoises) |
|---|---|---|
| 2 | 6 | 1,975 |
| 2 | 12 | 1,700 |
| 3 | 60 | 1,350 |

A portion of the copolymer was suspended in toluene, stirred and ammonia gas was passed in, until no more was absorbed, to give the amide ammonium salt which was recovered by filtration and dried.

A 0.5% solution of this amide ammonium salt was prepared by sprinkling 2 parts into 398 parts of cold water with stirring. It dissolved rapidly and its viscosity values, measured with a Brookfield LTV viscometer, were:

| Spindle | Speed | Viscosity (centipoises) |
|---|---|---|
| 3 | 0.3 | 308,000 |
| 3 | 0.6 | 178,000 |
| 4 | 6 | 35,000 |
| 4 | 12 | 22,000 |
| 4 | 30 | 11,400 |
| 4 | 60 | 7,050 |

For a comparison a 10% cold-water starch wallpaper paste was prepared according to the manufacturer's instructions. It had the following viscosity values:

| Spindle | Speed | Viscosity (centipoises) |
|---|---|---|
| 4 | 1.5 | 175,200 |
| 4 | 3 | 120,400 |
| 4 | 6 | 81,200 |

The two mixes were then used to stick 6 foot strips of a medium-weight wallpaper to a wall and their performance was compared.

The copolymer salt solution was easier to apply to wallpaper than a starch paste and it showed comparable slip characteristics immediately after application to the wall; it dried to give a firm bond and a smooth paper surface free from bubbles.

EXAMPLE 2

The polymerization of Example 1 was repeated using the same procedure and proportions of reactions as in Example 1 except that the quantity of methylene chloride was reduced from 4,000 parts to 2,700 parts. The yield of maleic anhydride/methyl vinyl ether copolymer was 96% of the theoretical. A 1% solution of the copolymer in methyl ethyl ketone at 25° C. had a specific viscosity of 13.0.

EXAMPLE 3

A stainless steel pressure vessel was purged with gaseous methyl vinyl ether and a mixture of 300 parts maleic anhydride, 1,480 parts methyl vinyl ether (a molar ratio of 1 to 8.3), 4,000 parts methylene chloride and 1 part lauroyl peroxide was added. The vessel was sealed, heated to 60° C. and maintained thereat for 5.5 hours, the mixture being stirred throughout. The polymerization proceeded smoothly and the maximum pressure developed was 33 lb. The vessel was then vented through a condenser into a cooled receiver, whereupon a mixture of the excess methyl vinyl ether and some of the methylene chloride distilled out at a reaction mixture temperature of 38° C. over 1.5 hours. The slurry remaining in the vessel was cooled, filtered and dried under vacuum. The yield of maleic anhydride/methyl vinyl ether copolymer was practically theoretical and its specific viscosity as a 1% solution in methyl ethyl ketone at 25° C. was 21.5. All but 3% of the total methyl vinyl ether employed was accounted for by consumption in the reaction or recovered by distillation. The remaining quantity was in the vapours from the vacuum drying step and could have been easily recovered had this been desired.

EXAMPLE 4

A mixture of 40 parts maleic anhydride, 50 parts ethyl vinyl ether (being a molar ratio of 1 to 1.7), 535 parts methylene chloride and 0.2 part lauroyl peroxide was heated under reflux at atmospheric pressure for 22 hours, giving a liquid temperature of 40° C. Maleic anhydride/ethyl vinyl ether copolymer was recovered by filtration as a granular white solid in theoretical yield. Its specific viscosity measured as a 1% solution in methyl ethyl ketone was 18.2.

EXAMPLE 5

A mixture of 200 parts maleic anhydride, 275 parts ethyl vinyl ether (molar ratio 1 to 1.9), 2,960 parts methylene chloride and 0.5 part lauroyl peroxide was heated under reflux at atmospheric pressure for 22 hours. The granular solid product was filtered off and dried. A portion was dissolved in dilute sodium hydroxide solution to give a 0.5% solution of a partial sodium salt, pH 6. The viscosity of the solution measured with a Brookfield LVT viscometer was 41,000 cp. using spindle 4 at speed 6.

What we claim is:

1. A process for the preparation of maleic anhydride/alkyl vinyl ether copolymer which comprises reacting maleic anhydride with alkyl vinyl ether in the presence of methylene chloride and a free-radical-generating agent, the vinyl molar ratio of alkyl ether to maleic anhydride being at least 1.5:1.

2. A process as claimed in claim 1 wherein the alkyl vinyl ether comprises a lower alkyl vinyl ether.

3. A process as claimed in claim 1 wherein the alkyl vinyl ether comprises methyl, ethyl, n-propyl, isopropyl, n-butyl or isobutyl vinyl ether.

4. A process as claimed in claim 1 wherein the molar ratio of alkyl vinyl ether to maleic anhydride is at least 1.5:1 and not more than 12:1.

5. A process as claimed in claim 1 wherein the maleic anhydride constitutes 1 to 20% by weight of the reaction mixture.

6. A process as claimed in claim 1 wherein the maleic anhydride constitutes 6 to 10% by weight of the reaction mixture.

7. A process as claimed in claim 1 wherein the weight of methylene chloride is at least twice the weight of the maleic anhydride.

8. A process as claimed in claim 1 wherein the reaction mixture comprises 6 to 10% by weight of maleic anhydride, 16 to 70% by weight of alkyl vinyl ether and 24 to 74% by weight of methylene chloride.

9. A process as claimed in claim 1 wherein the free-radical-generating agent comprises organic peroxide or hydroperoxide, per-ester or an azo-compound.

10. A process as claimed in claim 9 wherein the free-radical - generating agent comprises lauroyl peroxide, benzoyl peroxide or azobisisobutyronitrile.

11. A process as claimed in claim 1 wherein the amount of free-radical-generating agent is 0.005 to 5% by weight of the maleic anhydride.

12. A process as claimed in claim 1 wherein the amount of free-radical-generating agent is 0.01 to 1% by weight of the maleic anhydride.

13. A process as claimed in claim 1 wherein the reaction temperature is within the range 35 to 80° C.

14. A process as claimed in claim 1 wherein the reaction is carried out in a closed vessel under superatmospheric pressure.

References Cited

UNITED STATES PATENTS

| | | | |
|---|---|---|---|
| 2,782,182 | 2/1957 | Verburg | 260—78.5 |
| 2,872,436 | 2/1959 | Hibbard | 260—78.5 |
| 3,388,106 | 6/1968 | Muskat | 260—78.5 |

FOREIGN PATENTS

| | | | |
|---|---|---|---|
| 783,677 | 9/1957 | Great Britain | 260—78.5 |

MURRAY TILLMAN, Primary Examiner

W. J. BRIGGS, Sr., Assistant Examiner

U.S. Cl. X.R.

206—29.6 H, 33.8 UA